US012771708B2

(12) United States Patent
Iyer et al.

(10) Patent No.: US 12,771,708 B2
(45) Date of Patent: Oct. 20, 2026

(54) AI-ASSISTED OT CYBERSECURITY VULNERABILITY ASSESSMENT

(71) Applicant: Rockwell Automation Technologies, Inc., Mayfield Heights, OH (US)

(72) Inventors: Ganesh H. Iyer, Bangalore (IN); Vignesh Ravishankar, Solihull (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 65 days.

(21) Appl. No.: 18/902,132

(22) Filed: Sep. 30, 2024

(65) Prior Publication Data

US 2026/0095476 A1 Apr. 2, 2026

(51) Int. Cl.

| | |
|---|---|
| ***H04L 29/06*** | (2006.01) |
| ***G05B 19/408*** | (2006.01) |
| ***H04L 9/40*** | (2022.01) |

(52) U.S. Cl.

CPC ...... *H04L 63/1433* (2013.01); *G05B 19/4083* (2013.01); *G05B 2219/31418* (2013.01)

(58) Field of Classification Search

CPC . H04L 63/1433; H04L 63/20; H04L 63/1475; H04L 63/0807; H04L 63/10; H04L 63/0263

See application file for complete search history.

(56) References Cited

U.S. PATENT DOCUMENTS

| | | | | |
|---|---|---|---|---|
| 12,088,599 | B1 | 9/2024 | McCarson | |
| 12,095,786 | B1 * | 9/2024 | Arbel | H04L 63/1433 |
| 2019/0377880 | A1 * | 12/2019 | Kolychev | G06N 3/0442 |
| 2021/0021636 | A1 | 1/2021 | Sbandi | |
| 2023/0283521 | A1 | 9/2023 | Berger et al. | |
| 2024/0163304 | A1 | 5/2024 | Gupta | |

OTHER PUBLICATIONS

Extended European Search Report for Application No. 25187564.7 mailed Aug. 20, 2025, 12 pages.

* cited by examiner

*Primary Examiner* — Longbit Chai

(74) *Attorney, Agent, or Firm* — Fletcher Yoder, P.C.

(57) ABSTRACT

A method may include querying, via a processing system, a database comprising a list of cybersecurity threats associated with operational technology (OT) devices within an industrial system. The method may also include identifying OT devices associated with the list of cybersecurity threats, generating scripts configured to confirm that the OT devices are associated with at least one cybersecurity threat of the list of cybersecurity threats, and sending the scripts to the one or more OT devices. The method may then involve determining that the OT devices are associated with the at least one cybersecurity threat based on responses from the OT devices generated based on the scripts, generating instructions for resolving the at least one cybersecurity threat based on a generative artificial intelligence (AI) system, and sending the instructions to one or more devices.

18 Claims, 3 Drawing Sheets

AI-ASSISTED OT CYBERSECURITY VULNERABILITY ASSESSMENT

CROSS-REFERENCE TO RELATED APPLICATION

BACKGROUND

This disclosure generally relates to industrial automation systems and, more particularly, to identifying cybersecurity vulnerabilities in industrial automation systems.

In industrial automation systems, cybersecurity threats are increasingly risk the operations and production of industrial automation systems. However, traditional methods for detecting cybersecurity threats in industrial systems may prove to be challenging. With this in mind, it may be beneficial to leverage tools and services employed for industrial devices (e.g., operational technology (OT) devices) to perform more efficient cybersecurity threat analysis.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a method may include querying, via a processing system, a database comprising a list of cybersecurity threats associated with operational technology (OT) devices within an industrial system. The method may also include identifying OT devices associated with the list of cybersecurity threats, generating scripts configured to confirm that the OT devices are associated with at least one cybersecurity threat of the list of cybersecurity threats, and sending the scripts to the one or more OT devices. The method may then involve determining that the OT devices are associated with the at least one cybersecurity threat based on responses from the OT devices generated based on the scripts, generating instructions for resolving the at least one cybersecurity threat based on a generative artificial intelligence (AI) system, and sending the instructions to one or more devices.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
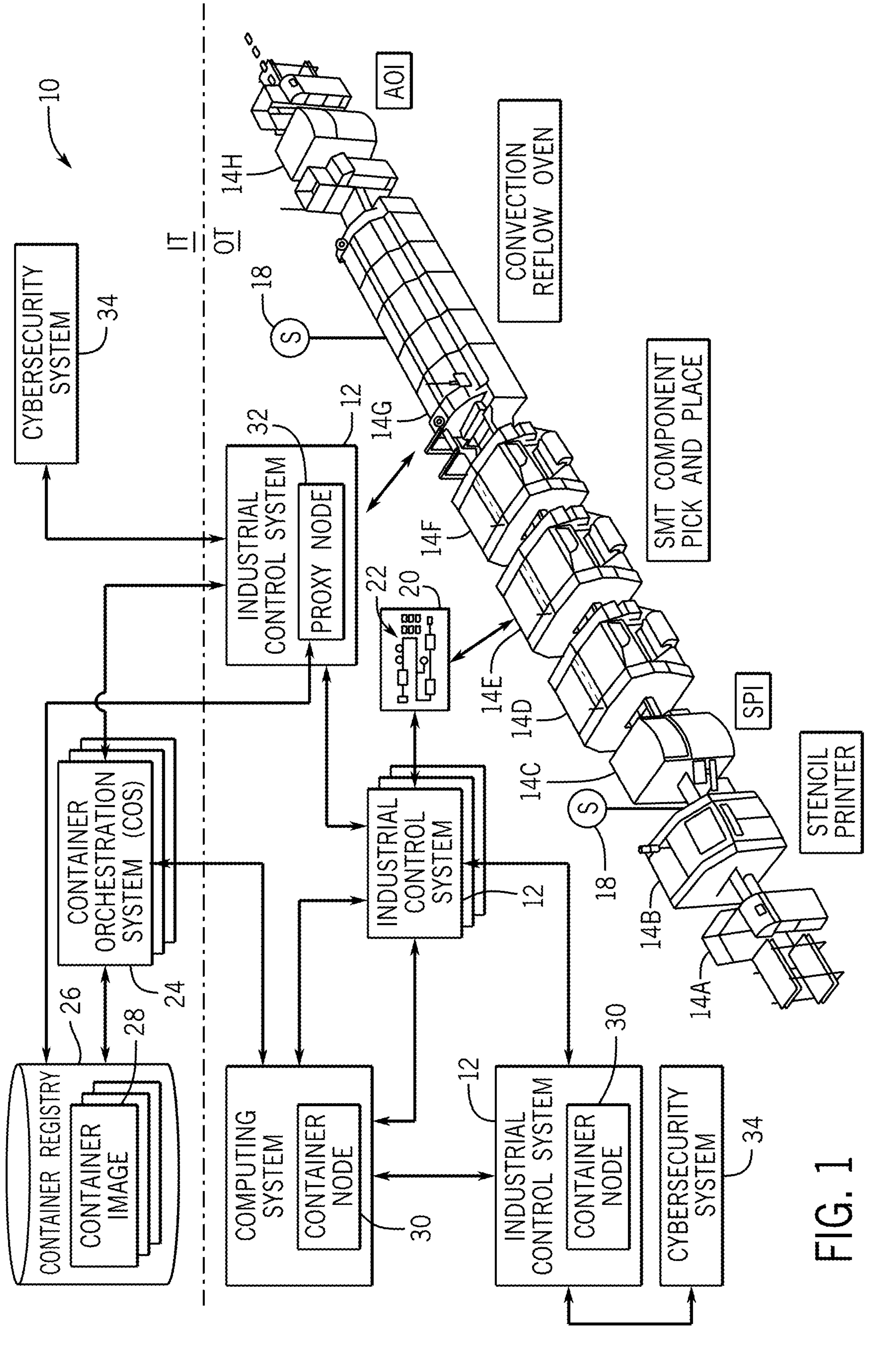
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are generally directed toward a cybersecurity system that monitors various data sources for cybersecurity vulnerabilities that may be present in industrial automation systems. In some embodiments, an industrial automation system may include industrial automation devices that operate in an operational technology (OT) network. As such, the cybersecurity system may work within the OT network or in tandem with an informational technology (IT) network and/or industrial control systems to control, monitor, and otherwise manage devices of the industrial automation system. In any case, the cybersecurity system may collect and analyze data acquired from OT devices to determine whether the OT devices may be at risk for a cybersecurity attack that may threaten the operations of the respective devices and the like.

In some embodiments, information regarding various cybersecurity vulnerabilities, such as operating system vulnerabilities, server-side vulnerabilities, client-side vulnerabilities, and the like may be stored in various data sources. Indeed, certain security databases (e.g., publicly or privately available) may provide a list of common vulnerabilities and exposure (CVE) (e.g., cisa. gov lists). With this in mind, the cybersecurity system may employ an artificial intelligence (AI) component that may monitor the published list and generative service tickets to deploy to computing systems to address the newly detected vulnerabilities. That is, the cybersecurity system may receive or monitor for updates regarding newly published cybersecurity vulnerabilities and identify the machines or devices that may be affected by the vulnerabilities. In some embodiments, the AI component may leverage generative AI tools to better assess or more accurately determine whether the devices are or will be affected by the vulnerabilities and generate scripts to deploy to the devices to proactively address the vulnerabilities. That is, the vulnerabilities (e.g., software vulnerabilities) may be difficult to decipher from the lists. As such, the cybersecurity system may employ a generative AI system to evaluate the vulnerability lists with respect to the equipment available to the user. Further, the AI system may evaluate the assets to identify the assets that may benefit from an update or may benefit from individual attention from a user. In some embodiments, the cybersecurity system may automatically software patches based on the analysis.

In addition, the cybersecurity system may receive user input to evaluate vulnerabilities in the OT landscape related to various types of equipment, routers, edge devices, various types of operational support systems (OSS), legacy software, legacy versions, software patches, and the like. As such, the cybersecurity system may query the various devices available in the OT space, detect whether the devices are associated with any of the listed vulnerabilities or those input by users. The cybersecurity system may then generate prompts or instructions for a user to follow to resolve the detected vulnerabilities. In some embodiments, the order or manner in which the automatically detected vulnerabilities and the manually provided vulnerabilities are resolved may be accounted for by the cybersecurity system to ensure that the production of the respective industrial automation system and the respective devices are maximized with respect to any downtime that may be involved to resolve the vulnerabilities.

In some embodiments, the cybersecurity system may deploy containers, which may include packages of software that may include various elements needed to run in one or more software environments, to resolve the detected vulnerabilities. As a result, containers may be deployed as individual software modules that perform specific operations or functions on the data provided to the respective container. Keeping this in mind, an industrial automation system is made up of many devices disposed in different network layers. Some devices are disposed in lower levels of a hierarchy, while other devices may be disposed on a higher level. Devices at relatively higher hierarchy levels may have the ability to view or access multiple devices on any level lower than and/or equal to its respective level. As such, containers operating on higher level devices may be suited to perform data analysis via data contextualization and/or crowd-sourcing to identify devices that may be at risk with respect to any potential vulnerabilities. Additional details are discussed below with reference to FIGS. 1-3.

Figure 2:
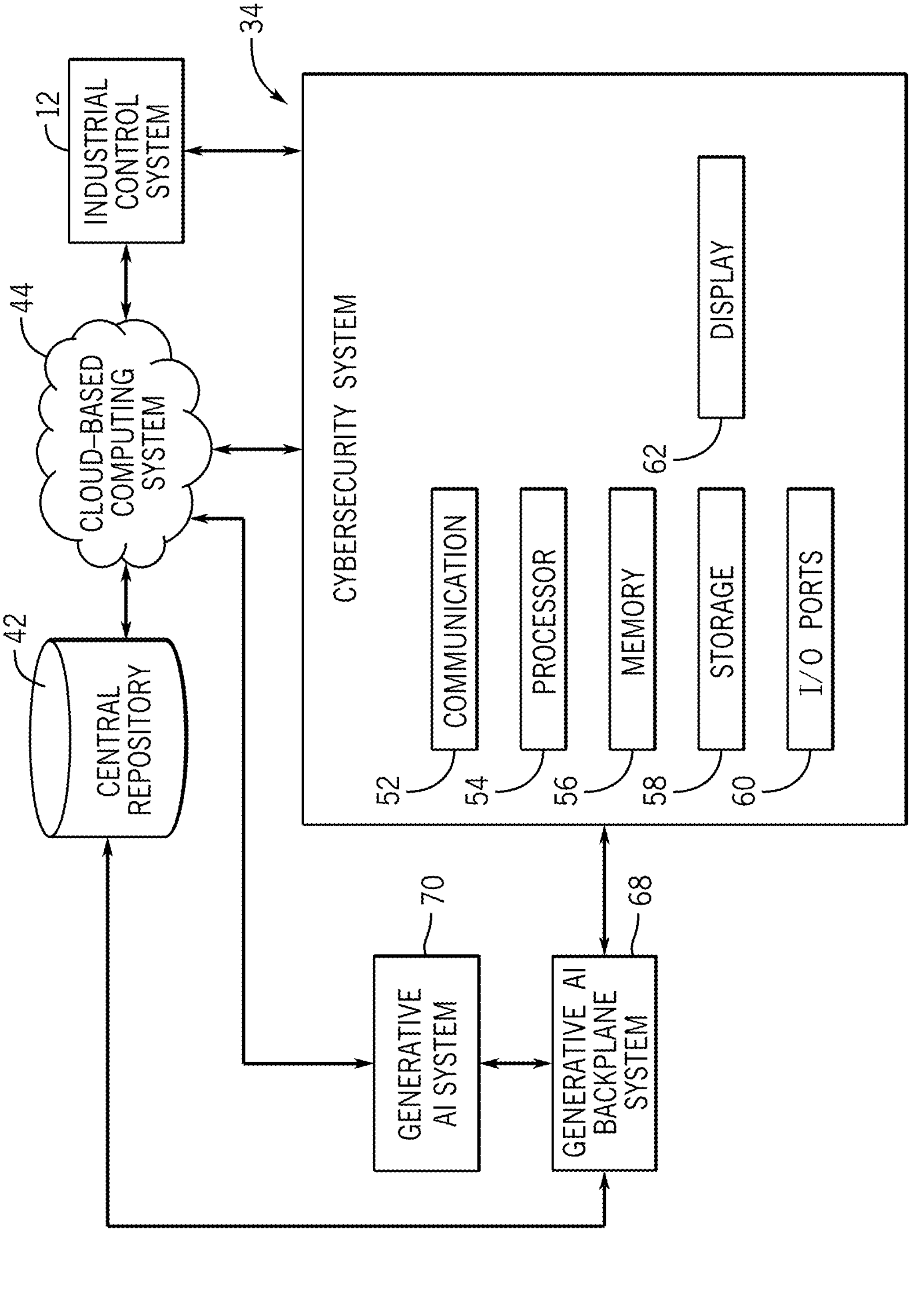
FIG. 2 is an illustration of a cybersecurity system, in accordance with an embodiment.

By way of introduction, FIG. 1 is a perspective view of an example industrial automation system 10 controlled by one or more industrial control systems 12. The industrial automation system 10 includes stations 14 (e.g., stations 14A through 14H) having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of industrial automation devices, such as electric motors, valves, actuators, temperature elements, pressure sensors, or a myriad of machinery or devices used for manufacturing, processing, material handling, and other applications. The industrial automation devices may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described industrial automation devices may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14A through 14H, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 22 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 22. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display 20 may present a display/operator interface 22 depicting representations of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 22. The person operating and/or monitoring the industrial automation system 10 may reference the display/operator interface 22 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices (e.g., IT device) that coordinates an automatic process of managing or scheduling work of individual containers for applications within the computing devices of the cluster. In other words, the container orchestration system may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a controller node that retrieves the deployment configuration files from the container registry 26, schedules the deployment of pods to the connected nodes, and ensures that the desired state specified in the deployment configuration file is met. For instance, if a pod stops operating on one node, the controller node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the controller node in the container orchestration system 24. In this way, the controller node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the controller node of the container orchestration system 24. The limited features implementable by the container nodes 30 that operate in the passive-indirect mode may be limited to commands that the respective industrial control system 12 may implement using native commands that map directly to the commands received by the controller node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the controller node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the controller node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the controller node of the container orchestration system 24 on behalf of the industrial control system 12.

Additionally, the industrial control system 12 may share an OT device tree via the proxy node 32. As such, the proxy node 32 may provide the controller node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

In some embodiments, the industrial automation system 10 may also include a cybersecurity system 34. The cybersecurity system 34 may operate in the IT space, the OT space, or both. That is, as will be discussed in more detail with reference to FIG. 2, the cybersecurity system 34 may be communicatively coupled to the industrial control system 12 via any suitable communication protocol across the IT space and the OT space or locally present on the OT space. In some embodiments, the functions and operations performed by the cybersecurity system 34 may be implemented as a container deployed vit that container orchestration system 24 described above. However, it should be understood that the cybersecurity system 34 may also operate independently (e.g., without container orchestration system 24) to perform the embodiments described herein.

With this in mind, data may be collected from the industrial automation devices by the industrial control system 12. The collected data may include operational data detailing operational parameters (e.g., settings, speed, temperature, pressure, thresholds, alarms), device types, device identification numbers, software versions, firmware versions, installed cybersecurity software, and the like. In some embodiments, the datasets related to the industrial automation system of the OT space may be stored in a central repository 42 or the like and may be made available to cybersecurity system 34 via a cloud-based computing system 44, a network, or the like.

The central repository 42 may also include information related to cybersecurity threats as published via social media platforms (e.g., X®, Twitter®), internal media platforms, news releases, and the like. In some embodiments, certain websites and organizations provide updated information related to existing and newly identified cybersecurity threats. For example, the National Institute of Standards and Technology (NIST) may publish reports and frameworks related to cybersecurity. In addition, the central repository 42 may include information from the Cybersecurity and Infrastructure Security Agency (CISA), which a part of the U.S. Department of Homeland Security. CISA sites may be queried to update the central repository 42 based on the frequent updates on current threats, vulnerabilities, and recommended actions listed. The SANS Institute may also publish various lists, such as the Top Cybersecurity Risks and Top Cybersecurity Threats, which may be stored in the central repository 42. In addition, the Open Web Application Security Project (OWASP) lists the security risks that relate to web applications. The MITRE ATT&CK Framework may provide a globally accessible knowledge base of adversary tactics and techniques based on real-world observations. Further, the Verizon Data Breach Investigations Report (DBIR) may provide an annual publication that includes a detailed analysis of data breaches, including common attack patterns and emerging threats. The central repository 42 may also be updated with electronic sources of data such as blogs, websites, social media posts, and the like. In yet another example, the central repository 42 may include information obtained from Symantec's Internet Security Threat Report (ISTR), which provides an overview of the latest cyber threats, including data breaches, ransomware, and emerging attack vectors. Moreover, the McAfee Threat Center may publish information on the latest cyber threats, including threat reports, blogs, and analysis.

In any case, the central repository 42 may store information related to various cybersecurity threats in a database that is structured based on a relevance to various types of devices that may be part of the industrial automation system 10. In this way, the cybersecurity system 34 may query the central repository 42 based on the type of devices to efficiently identify updated cybersecurity threats that may be at risk to those devices.

Figure 3:
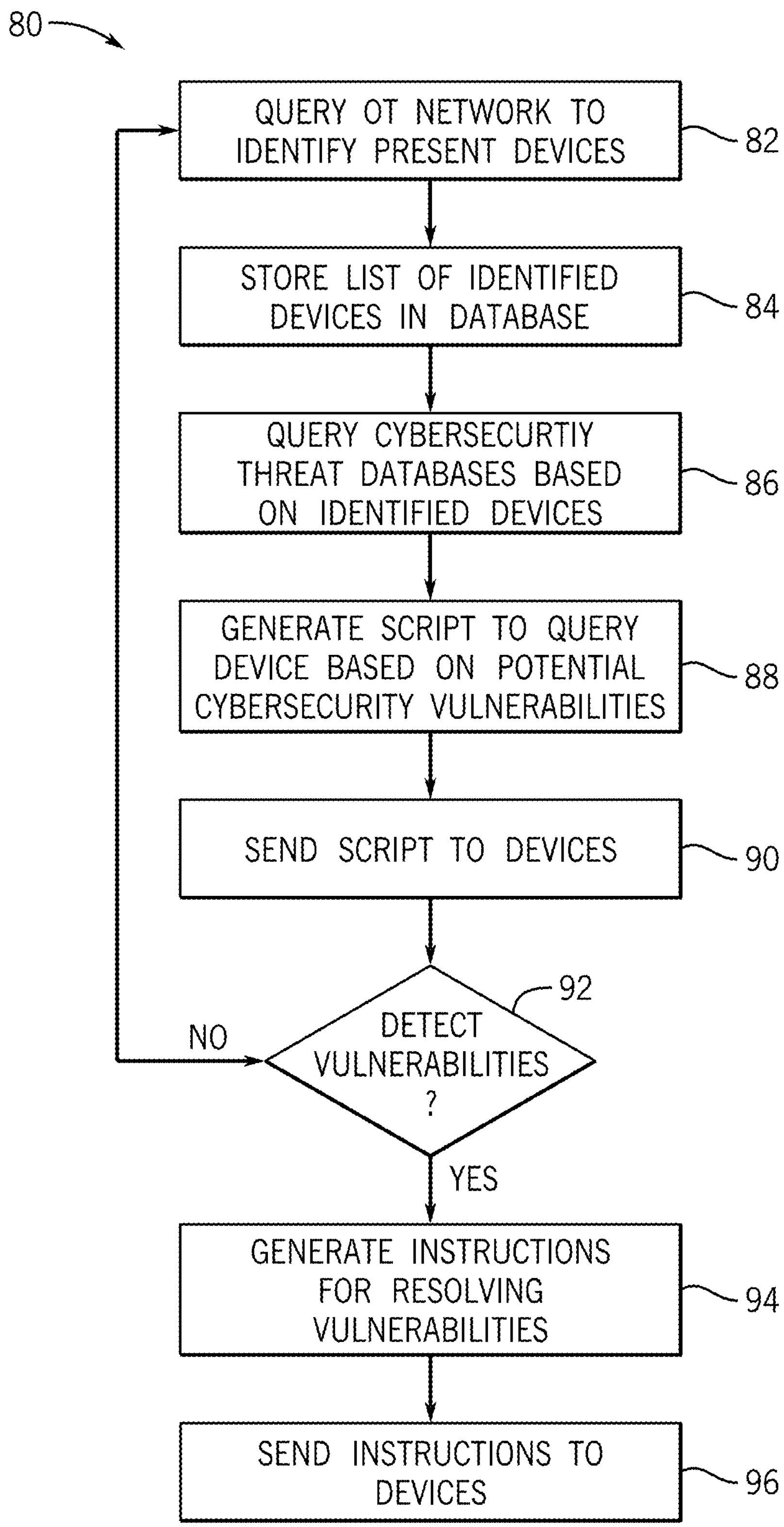
FIG. 3 is a flow chart of a method for updating operations of devices based on detected cybersecurity vulnerabilities, in accordance with an embodiment.

FIG. 3 illustrates example components that may be part of the cybersecurity system 34, in accordance with embodiments presented herein. For example, the cybersecurity system 34 may include a communication component 52, a processor 54, a memory 56, a storage 58, input/output (I/O) ports 60, a display 62, and the like. The communication component 52 may be a wireless or wired communication component that may facilitate communication between the industrial automation component that may be part of the industrial control system 12, the cloud-based computing system 44, the central repository 42, and other communication capable devices.

In some embodiments, the cloud-based computing system 44 may host a number of services via computing system resources that may be distributed over multiple locations. In this way, the various computing system resources may be scaled as needed to perform various operations. In some embodiments, the cybersecurity system 34 may be implemented via the cloud-based computing system 44, as a separate computing system, or both.

Further, datasets acquired via the industrial automation components, the industrial control system 12, or the like may be stored in the central repository 42. In addition, the simulated datasets acquired by digital twin systems that mirror or simulate the operations of an industrial automation system 10 may be included in the central repository 42. In any case, the central repository 42 may include one or more databases or data structures for storing and querying datasets in a structured and efficient manner.

The processor 54 may be any type of computer processor or microprocessor capable of executing computer-executable code. The processor 54 may also include multiple processors that may perform the operations described below. The memory 56 and the storage 58 may be any suitable articles of manufacture that can serve as media to store processor-executable code, data, or the like. These articles of manufacture may represent computer-readable media (e.g., any suitable form of memory or storage) that may store the processor-executable code used by the processor 54 to perform the presently disclosed techniques. Generally, the processor 54 may execute software applications that include programs that query databases, generate scripts, send commands, and the like. In some embodiments, the software applications may communicate with the industrial control system 12 and may gather information associated with operations the industrial automation devices via the sensors disposed on the industrial automation devices.

The memory 56 and the storage 58 may also be used to store the data, analysis of the data, the software applications, and the like. The memory 56 and the storage 58 may represent non-transitory computer-readable media (e.g., any suitable form of memory or storage) that may store the processor-executable code used by the processor 54 to perform various techniques described herein. It should be noted that non-transitory merely indicates that the media is tangible and not a signal.

In one embodiment, the memory 56 and/or storage 58 may include a software application that may be executed by the processor 54 and may be used to monitor, control, access, or view one of the industrial automation components. As such, the cybersecurity system 34 may communicatively couple to industrial automation devices via a direct connection between the devices, via the cloud-based computing system 84, or the like.

The I/O ports 60 may be interfaces that may couple to other peripheral components such as input devices (e.g., keyboard, mouse), sensors, input/output (I/O) modules, and the like. I/O modules may enable the cybersecurity system 34 to communicate with the industrial automation devices or other devices in the industrial automation system 10 via the I/O modules.

The display 62 may depict visualizations associated with software or executable code being processed by the processor 54. In one embodiment, the display 62 may be a touch display capable of receiving inputs from a user of the cybersecurity system 34. As such, the display 62 may serve as a user interface to provide parameters and instructions to guide the operation of the cybersecurity system 34. The display 62 may be used to display a graphical user interface (GUI) for operating the cybersecurity system 34. The display 62 may be any suitable type of display, such as a liquid crystal display (LCD), plasma display, or an organic light emitting diode (OLED) display, for example. Additionally, in one embodiment, the display 62 may be provided in conjunction with a touch-sensitive mechanism (e.g., a touch screen) that may function as part of a control interface for the industrial automation components to control the general operations of the system 10 or the like.

Although the components described above have been discussed with regard to the cybersecurity system 34, it should be noted that similar components may make up other computing devices described herein. Further, it should be noted that the listed components are provided as example components and the embodiments described herein are not to be limited to the components described with reference to FIG. 3.

In addition to communicating with the cloud-based computing system 44, the central repository 42, and the distributed control system 48, the cybersecurity system 34 may also communicate with a generative AI backplane system 68 and a generative AI system 70. The generative AI backplane system 68 and the generative AI system 70 may operate independently, be hosted by the cloud-based computing system 44, and the like. In any case, the generative AI backplane system 68 may interface or interact with the generative AI system 70 to retrieve generative AI instructions or scripts related to identified cybersecurity threats.

By way of example, the generative AI system 70 may include any suitable generative AI technology, such as generative pre-trained transformer (GPT) 3, 4, and the like.

As such, the generative AI system 70 may include a deep neural network model that has been trained on text data from various sources (e.g., internet). The generative AI system 70 may perform natural language processing tasks, such that received inquiries may be processed and natural language response may be provided in response to the inquiries. By way of example, the generative AI system 70 may employ a transformer architecture (e.g., neural network architecture) that uses an encoder to process an input sequence of tokens that may be processed in parallel (e.g., simultaneously) to provide a continuous vector representation of relationships between tokens (e.g., words in inquiries). The generative AI system 70 may also include a decoder that may generate an output sequence of tokens based on the encoded input. The decoder may take context from the encoder and generate output tokens using a model (e.g., autoregressive model).

With this in mind, the generative AI system 70 may be pre-trained on a wide variety of publicly available data, but it may lack the ability to provide contextual answers for propriety datasets, such as the data acquired by the industrial automation devices, the industrial control system 12, and the like. That is, these data sources are secured via firewall, encryption, and other security measure to ensure that proprietary datasets and processes are not shared with competitors or the general public. In this way, the generative AI system 70 may not be capable of providing accurate responses to inquiries that are related to proprietary datasets that it may not be able to or may be prohibited from accessing.

In some embodiments, the generative AI backplane system 68 may enable the generative AI system 70 to interface or access proprietary datasets to provide generative responses that are contextualized with respect to the respective industrial system. Indeed, the cybersecurity system 34 may facilitate the communication between the generative AI backplane system 68, the generative AI system 70, the various industrial data sources, and the user to provide a generative AI tool that the user may use to obtain real-time feedback responses. However, since the generative AI system 70 is not pre-trained on the datasets related to the industrial system, the generative AI backplane system 68 may package or process the industrial datasets related to an inquiry received via the cybersecurity system 34, such that the generative AI system 70 may efficiently process the packaged dataset and apply its language model with respect to the industrial datasets to provide relevant answers to the inquiries. Moreover, in some embodiments, the generative AI backplane system 68 may provide structure for generating codes, scripts, instructions, workflows, and the like that is related to propriety or particular devices. Indeed, some proprietary information related to scripts used to control operations of industrial automation devices may be kept isolated away from public sources to ensure the respective devices are not subject to nefarious control operations due to cybersecurity threats.

With this in mind, the generative AI backplane system 68 may include pre-trained codes, scripts, instructions, workflows, and the like for various types of devices. In some embodiments, the generative AI backplane system 42 may interact with the central repository 42 to perform verification operations to confirm that the pre-trained algorithms may apply to the industrial automation devices that are present in the industrial automation system 10 based on the identifying information provided by the central repository 42.

Referring now to FIG. 3, FIG. 3 illustrates a flow chart of a method 80 for providing instructions for resolving cybersecurity threats, in accordance with embodiments presented herein. Although the following description of the method 80 will be discussed as being performed by the cybersecurity system 34, it should be understood that any suitable system, including the cybersecurity system 34 with the generate AI backplane system 68 and the generative AI system 70, may perform the method 80 in any suitable order.

Referring now to FIG. 3, at block 82, the cybersecurity system 34 may query the OT network to identify the industrial automation devices that may be present in the industrial automation system 10. In some embodiments, the cybersecurity system 34 may access various routers, access points, and other devices present in the OT space the central repository 42 to detect the presence of various OT devices. Additionally, the cybersecurity system 34 may query based on a location, identification number, client name, or other suitable parameter to retrieve a list of OT devices that may be accessible to the cybersecurity system 34. In addition, the cybersecurity system 34 may coordinate with the container orchestration system 24 to query container nodes 30 and identify the OT devices that may be accessible to the cybersecurity system 34.

After identifying the present OT devices, the cybersecurity system 34 may, at block 84, store the newly identified devices in the central repository 42 or the like. In some embodiments, the central repository 42 may be organized or structured such that the identified devices may be grouped together by type, location, client, and other hierarchical features (e.g., factory, floor, line).

At block 86, the cybersecurity system 34 may query the central repository 42 for cybersecurity threats that may be related to the OT devices identified above. As discussed above, the cybersecurity system 34 may query the central repository 42 based on the type of devices identified at block 82 to retrieve a list of cybersecurity threats that may be related to the identified OT devices.

In some embodiments, the lists of cybersecurity threats may be difficult to decipher. That is, the relevance or relatability of the cybersecurity threats with respect to various devices, software, or the like may be difficult to discern from the published notification stored in the central repository 42. As such, the generative AI system 70 may evaluate the lists to better ascertain the relevant portions of the notification or list to identify the type of cybersecurity risk, an association between the cybersecurity threat and a respective device/software/application, and the like.

At block 88, based on the cybersecurity threats that the cybersecurity system 34 identifies as being relevant to any of the identified OT devices, the cybersecurity system 34 may generate a script or software code for the OT device to execute and confirm whether the cyber security threat is present within the respective device. That is, list of cybersecurity threats may be specific to certain software applications, versions of software applications, types of operating systems, specific datasets stored in the respective device, and the like. As such, the presence of any particular OT device may not correspond to an authentic or valid cybersecurity threat. Instead, the script or code may be generated to cause the respective OT device or respective control system of the OT device to check for the presence of certain properties within the respective device. By way of example, the script may be designed to perform an operation with that causes expected outcome (e.g., change in operation, data storage). Alternatively, the script may be executed by a control system to query certain memory locations to retrieve information or data that may identify the type of applications that are present on the device, a serial number of the device, a type of the device, or the like.

In some embodiments, the cybersecurity system 34 may engage with the generative AI backplane system 68 and the generative AI system 70 to produce the scripts or code for execution by the respective device. As discussed above, the generative AI backplane system 68 may provide propriety information to enable the cybersecurity system 34 to access the respective device and generate an executable script for execution by the respective device. The propriety information may include encryption techniques, specific formatting, particular variables to use, and the like. The generative AI system 70 may then use the domain specific information to generate executable code based on the pre-trained models available to it.

After executing the scripts, the respective devices may return information retrieved via the script. As such, at block 92, the cybersecurity system 34 may determine whether any cybersecurity vulnerabilities were detected. Indeed, the cybersecurity system 34 may cross reference the cybersecurity threats identified at block 86 with the information provided by the respective devices. In this way, the cybersecurity system 34 may focus on the devices that are vulnerable to the cybersecurity threats, as opposed to sending updates to all of the available devices. As a result, the network bandwidth of the network within the OT space is efficiently used for limited communications.

If, at block 92, the cybersecurity system 34 does not detect any vulnerabilities, the cybersecurity system 34 may return to block 82 and continue the method 80. However, if the cybersecurity system 34 detects a vulnerability, the cybersecurity system 34 may proceed to block 94 and generate instructions or a workflow for resolving the vulnerability. The workflow may include a number of ordered operations to perform to resolve or update the device to secure it from the vulnerabilities. In some embodiments, the cybersecurity system 34 may again engage with the generative AI backplane system 68 and the generative AI system 70 to generate interpretable instructions for resolving the vulnerabilities. The generative AI system 70 may receive information from the central repository 42 to collect information regarding instructions related to resolving the vulnerabilities. The generative AI system 70 may then generate natural language instructions for use by a technician to update the operations of the device, deploy a software patch, update applications, install additional software, or perform any other suitable action to resolve the vulnerability.

In some embodiments, the cybersecurity system 34 may generate instructions for execution by the respective device to automatically resolve the vulnerabilities. The instructions may be generated in a similar fashion as described above with respect to generating the script. In any case, the instructions may cause the respective device or control system to perform certain operations to resolve the vulnerabilities. As such, the instructions may cause the respective device to download a software patch, upgrade a software component, prevent certain operations from being performed, and the like. In some embodiments, the instructions may cause the device to refrain from operations of go offline until personnel performs the workflow or other operations.

The instructions may also include script or code for generating a ticket or logging the issue for repair with a maintenance server system or the like. That is, the instructions may include code that generates service tickets for personnel to attend to certain detected cybersecurity threats. The service tickets may include contextual information that details information related to the device or type of device that is associated with the cybersecurity threat, natural language text that describes the cybersecurity threat, and natural language text that describes a manner or procedure to undertake to resolve or protect the device from the cybersecurity threat. In some embodiments, the service tickets may be generated in a particular order based on the hierarchy or structure of the respective industrial automation system 10 to ensure that the industrial automation system 10 remains operational or to minimize the amount of downtime of various device in the industrial automation system 10.

At block 96, the cybersecurity system 34 may send the instructions to the respective device, a control system for the device, a computing device associated with a user designated to resolve the issue, a server system, or the like. Indeed, in some embodiments, the cybersecurity system 34 may send the instructions and await for a confirmation signal to be received from the respective device to ensure that the instructions were received. If the confirmation was not received, the cybersecurity system 34 may send the instructions again.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

querying, via a processing system, a database comprising a list of cybersecurity threats associated with a plurality of operational technology (OT) devices within an industrial system, wherein the plurality of OT devices is configured to monitor or control one or more industrial devices within the industrial system, wherein the list of cybersecurity threats comprises one or more notifications published via one or more network sites, and wherein the one or more notifications correspond to one or more software applications executable by the plurality of OT devices;

receiving, via the processing system, one or more scripts to execute by one or more OT devices of the plurality of OT devices from a generative artificial intelligence (AI) system configured to:

determine one or more associations between the one or more notifications and the one or more OT devices based on a language model associated with the one or more OT devices, wherein the language model is trained based on proprietary data associated with the one or more OT devices;

identify the one or more OT devices based on the one or more associations; and generate the one or more scripts configured to confirm that the one or more OT devices are associated with at least one cybersecurity threat of the list of cybersecurity threats based on the language model;

sending, via the processing system, the one or more scripts to the one or more OT devices, wherein the one or more scripts are configured to be executed by the one or more OT devices to detect a presence of the at least one cybersecurity threat;

determining, via the processing system, that the one or more OT devices are associated with the at least one cybersecurity threat based on one or more responses from the one or more OT devices generated based on the one or more scripts;

generating, via the processing system, one or more natural language instructions for resolving the at least one cybersecurity threat in response to determining that the one or more OT devices are associated with the at least one cybersecurity threats; and sending, via the processing system, the one or more natural language instructions to one or more devices.

2. The method of claim 1, sending one or more instructions to the one or more devices, wherein the one or more devices are configured to adjust one or more operations.

3. The method of claim 2, wherein the one or more operations comprise updating a software, changing operational parameters, or both.

4. The method of claim 1, wherein the one or more natural language instructions comprise natural language text indicative of a workflow to implement for resolving the at least one cybersecurity threat, wherein the natural language text is generated by the generative AI system.

5. The method of claim 4, wherein the natural language text is generated by the generative AI system and a generative AI backplane system comprising the proprietary data associated with the one or more OT devices.

6. The method of claim 1, wherein the one or more scripts are generated using one or more programming languages associated with one or more control systems corresponding to the one or more OT devices.

7. The method of claim 2, wherein the one or more instructions are configured to cause the one or more devices to generate one or more service tickets for resolving the at least one cybersecurity threat.

8. A non-transitory computer-readable medium comprising computer-executable instructions that, when executed, are configured to cause a processing system to perform operations comprising:

querying a database comprising a list of cybersecurity threats associated with a plurality of operational technology (OT) devices within an industrial system, wherein the plurality of OT devices is configured to monitor or control one or more industrial devices within the industrial system, wherein the list of cybersecurity threats comprises one or more notifications published via one or more network sites, and wherein the one or more notifications correspond to one or more software applications executable by the plurality of OT devices;

receiving one or more scripts to execute by one or more OT devices of the plurality of OT devices from a generative artificial intelligence (AI) system configured to:

determine one or more associations between the one or more notifications and the one or more OT devices based on a language model associated with the one or more OT devices, wherein the language model is trained based on proprietary data associated with the one or more OT devices;

identify the one or more OT devices based on the one or more associations; and generate the one or more scripts configured to confirm that the one or more OT devices are associated with at least one cybersecurity threat of the list of cybersecurity threats based on the language model;

sending the one or more scripts to the one or more OT devices, wherein the one or more scripts are configured to be executed by the one or more OT devices to detect a presence of the at least one cybersecurity threat;

determining that the one or more OT devices are associated with the at least one cybersecurity threat based on one or more responses from the OT devices generated based on the one or more scripts;

generating one or more natural language instructions for resolving the at least one cybersecurity threat in response to determining that the one or more OT devices are associated with the at least one cybersecurity threats; and sending the one or more natural language instructions to one or more devices.

9. The non-transitory computer-readable medium of claim 8, wherein the computer-executable instructions are configured to cause the processing system to perform additional operations comprising sending one or more instructions configured to cause the one or more devices to adjust one or more operations.

10. The non-transitory computer-readable medium of claim 9, wherein the one or more operations comprise updating a software, changing operational parameters, or both.

11. The non-transitory computer-readable medium of claim 8, wherein the one or more natural language instructions comprise natural language text indicative of a workflow to implement for resolving the at least one cybersecurity threat, wherein the natural language text is generated by the generative AI system.

12. The non-transitory computer-readable medium of claim 11, wherein the natural language text is generated by the generative AI system and a generative AI backplane system comprising the proprietary data associated with the one or more OT devices.

13. The non-transitory computer-readable medium of claim 8, wherein the one or more scripts are generated using one or more programming languages associated with one or more control systems corresponding to the one or more OT devices.

14. The non-transitory computer-readable medium of claim 9, wherein the one or more instructions are configured to cause the one or more devices to generate one or more service tickets for resolving the at least one cybersecurity threat.

15. A system, comprising:

a plurality of operational technology (OT) devices of an industrial system comprising at least one or more hardware processors; and a processing system configured to perform operations comprising:

querying a database comprising a list of cybersecurity threats associated with the plurality of OT devices within the industrial system, wherein the plurality of OT devices is configured to monitor or control one or more industrial devices within the industrial system, wherein the list of cybersecurity threats comprises one or more notifications published via one or more network sites, and wherein the one or more notifications correspond to one or more software applications executable by the plurality of OT devices;

receiving one or more scripts to execute by one or more OT devices of the plurality of OT devices from a generative artificial intelligence (AI) system configured to:

determine one or more associations between the one or more notifications and the one or more OT devices based on a language model associated with the one or more OT devices, wherein the language model is trained based on proprietary data associated with the one or more OT devices;

identify the one or more OT devices based on the one or more associations; and generate the one or more scripts configured to confirm that the one or more OT devices are associated with at least one cybersecurity threat of the list of cybersecurity threats based on the language model;

sending the one or more scripts to the one or more OT devices, wherein the one or more scripts are configured to be executed by the one or more OT devices to detect a presence of the at least one cybersecurity threat;

determining that the one or more OT devices are associated with the at least one cybersecurity threat based on one or more responses from the one or more OT devices generated based on the one or more scripts;

generating one or more natural language instructions for resolving the at least one cybersecurity threat in response to determining that the one or more OT devices are associated with the at least one cybersecurity threats the generative AI system; and sending the one or more natural language instructions to one or more devices.

16. The system of claim 15, sending one or more instructions to the one or more devices, wherein the one or more devices are configured to adjust one or more operations.

17. The system of claim 16, wherein the one or more operations comprise updating a software, changing operational parameters, or both.

18. The system of claim 15, wherein the one or more natural language instructions comprise natural language text indicative of a workflow to implement for resolving the at least one cybersecurity threat, wherein the natural language text is generated by the generative AI system.

* * * * *